March 3, 1970  TAKESHI TSUCHIYA  3,498,123
APPARATUS FOR TESTING PISTON RINGS
Filed May 23, 1968  2 Sheets-Sheet 2

INVENTOR
Takeshi Tsuchiya
BY

United States Patent Office 3,498,123
Patented Mar. 3, 1970

3,498,123
APPARATUS FOR TESTING PISTON RINGS
Takeshi Tsuchiya, Tokyo, Japan, assignor to Nippon
Piston Ring Kabushiki Kaisha, Tokyo, Japan
Filed May 23, 1968, Ser. No. 731,568
Claims priority, application Japan, June 8, 1967,
42/36,225
Int. Cl. G01m 15/00
U.S. Cl. 73—120                                8 Claims

ABSTRACT OF THE DISCLOSURE

Apparatus for testing piston rings having a rigid cylinder provided with at least one radial passage therethrough. An outer face portion of a more flexible sleeve conformingly received in the cylinder is exposed in the cylinder passage and carries a strain gage. When a piston ring is held in engagement with the inner face of the sleeve near the recess in the cylinder, the gage measures the deformation of the sleeve portion on which it sits in the passage and thereby provides a measure of the ring pressure.

BACKGROUND OF THE INVENTION

This invention relates to the testing of piston rings, and particularly to apparatus for measuring the pressure expected to be exerted by piston rings on cooperating cylinders of an internal combustion engine and the like.

It is known to measure ring pressure in an apparatus which has a piston carrying the ring to be tested, a cylinder receiving the piston, the cylinder being formed with an external recess deep enough to have a thin-walled axially extending bottom, and a strain gage mounted on the bottom. The deflection of the thin-walled cylinder portion under the pressure of the piston ring is sensed by the strain gage which produces an electrical signal indicative of the ring pressure.

The known devices are difficult to calibrate, and the electrical signals produced by the strain gage cannot be converted to precise pressure values. The lack of precision of the known devices is due in part to the difficulty of shaping the inner wall face of the cylinder to a precisely circular cross section of uniform diameter and precise axial alignment. Any deviation from a precisely cylindrical shape affects the thickness distribution of the thin-walled portion and makes it difficult or impossible to predict the relationship between applied pressure and deflection. The configuration of the recess entering the cylinder wall from the outside has a similar effect.

The thin-walled portion of the known cylinder is integral on its entire perimeter with the practically rigid wall portion of full thickness. It is therefore restricted in flexure. It is almost impossible to measure the absolute value of the pressure exerted by a piston ring with high precision in the known devices even if they are new and in perfect condition.

During use of the known device, the thin-walled cylinder portion takes a permanent set. Although the strain or permanent deformation caused by a single test may be small, it accumulates over repeated runs. It is impractical to discard cylinders at frequent, short intervals, and it is equally impractical to recalibrate the apparatus. The readings thus become even less accurate and precise during extended use of the known device. Another source of declining accuracy during use is the wear on the inner cylinder wall during repeated test runs. A cylinder of initially precisely circular cross section tends to assume an oblong shape, thereby providing another uncontrolled variable which affects the test results.

The primary object of the invention is the provision of a piston ring testing apparatus which provides readings of high precision over an extended period without extensve and expensive maintenance operations.

SUMMARY OF THE INVENTION

With this object and others in view, as will hereinafter become apparent, the invention provides a testing apparatus of the general type described in which a cylinder is formed with an inwardly open radial recess in its axial wall. A sleeve less rigid than the cylinder wall is conformingly received in the cylinder so that a portion of its outer axial face is exposed in the aforementioned recess. It carries a strain gage. The piston ring to be tested is held in engagement with the inner face of the sleeve adjacent the recess, thereby causing a deformation of the exposed sleeve face portion which may be sensed by the strain gage.

Other features, additional objects and many of the attendant advantages of this invention will readily be appreciated as the same becomes better understood by reference to the following detailed description of a preferred embodiment when considered in connection with the appended drawing.

DESCRIPTION OF THE PREFERRED EMBODIMENT

Figure 1:
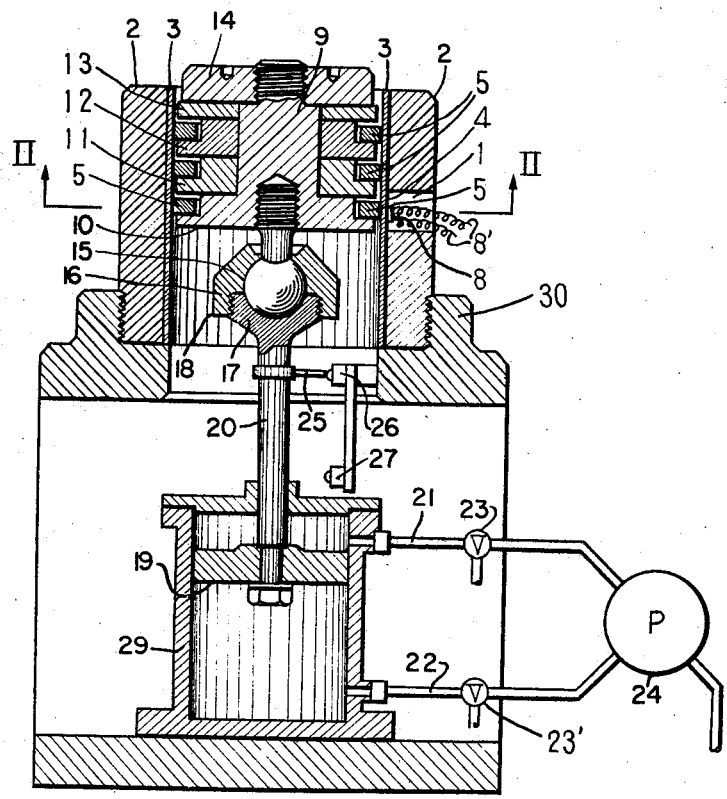
FIG. 1 shows a testing apparatus of the invention in elevational section.
Figure 2:
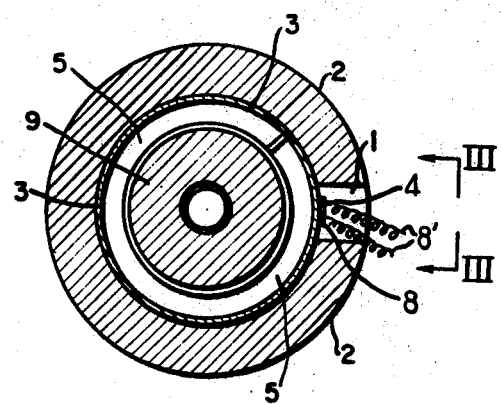
FIG. 2 shows the apparatus of FIG. 1 in plan section on the line II—II.

Referring now to the drawing in detail, the testing apparatus illustrated has a stationary frame 30 on which a rigid steel cylinder 2 is mounted, A rectangular radial passage 1 in the wall of the cylinder 2 provides an inwardly open recess, in which the outer axial face 4 of a thin, sheet steel sleeve 3 is partly exposed. The outer sleeve face 4 carries a coating of electrodo-deposited copper too thin to be visible on the scale of the drawing.

Figure 3:
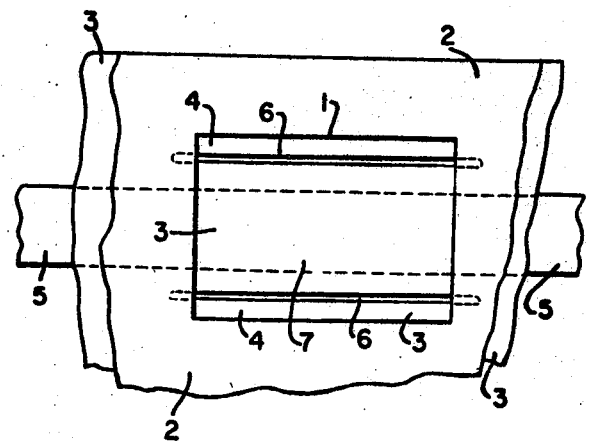
FIG. 3 is a fragmentary developed view of the apparatus of FIG. 1 on the line III—III, but on a larger scale.

The inner face of the sleeve 3 is engaged by three piston rings 5 which are circumferentially split in the conventional manner and of approximately rectangular cross section. In the illustrated condition of the apparatus, one of the rings 5 is radially aligned with the passage 1 as is best seen in FIG. 3.

The sleeve 3 has two circumferentially elongated, axially spaced, parallel slots 6 which terminate in the exposed portion of the sleeve face 4, the axial spacing of the slots 6 being slightly smaller than the axial width of the passage 1 and their circumferential lengths being greater than the corresponding dimension of the passage 1. A bridge portion 7 of the sleeve 3 between the slots 6 is thus movable with relatively great freedom under suitably applied stresses.

The inner face of the bridge portion 7 is engaged by the aligned piston ring 5. The outer face of the bridge portion 7 carries a resistance-wire strain gage 8, omitted from the showing of FIG. 3 for the sake of clarity. The leads 8' of the gage 8 are elements of the measuring circuit of the apparatus, conventional in itself and not otherwise shown. The non-illustrated portion of the circuit includes an indicating instrument whose reading is a measure of the radially outward deflection and circumferential expansion of the bridge portion 7 by the aligned ring 5.

The piston assembly which holds the three rings 5 has a stem portion 9 carrying an integral flange 10 whose circumference is provided with a groove open in an upward axial direction. The groove is closed by a radial wall of a retaining ring 11 axially slidable on the stem portion 9 and equipped with a groove similar to that of the flange 10. The stem portion 9, in axial sequence, carries yet another retaining ring 12 identical with the ring 11, and a flat annular plate 13 which closes the groove of the ring 12. A heavy nut 14 on terminal threads of the stem portion 9 holds the plate 13, rings 11, 12, and flange 10 in axially abutting fixed relationship. The grooves of the flange 10 and of the rings 11, 12 respectively hold the piston rings 5.

The actuating mechanism which axially reciprocates the piston assembly in the sleeve 3 includes a universal joint 18. The joint consists of a ball 15 fixedly and coaxially attached to the stem portion 9, and a socket constituted by a cap 16 and a receptacle 17 which movably envelop the ball 15 and are threadedly connected to each other. The receptacle 17 is fastened to the operating piston 19 of a hydraulic motor by a piston rod 20.

The motor also includes an operating cylinder 29 which is divided into two compartments by the piston 19. Conduits 21, 22 equipped with solenoid valves 23, 23' connect one of the compartments in the cylinder 29 with the discharge end of a pump 24 while the other compartment is connected to a sump, not itself shown, from which the pump intake draws hydraulic fluid in a conventional manner. The valves are operated through conventional relays (not shown) by two limit switches 26, 27 axially spaced on the frame 30 along the piston rod 20 and actuated by an abutment bar 25 on the piston rod.

The operating piston 19 thus moves upward under the pressure of hydraulic fluid admitted to the lower compartment of the cylinder 29 from the pump 24 through the valve 23' while the upper compartment is vented to the sump by the valve 23, until the position illustrated in FIG. 1 is reached in which the bar 25 actuates the limit switch 26, whereby the valves 23, 23' are operated to admit pressure fluid to the upper compartment of the cylinder 29, and to vent the lower compartment. The operating piston 19 moves downward until the bar 25 strikes the lower limit switch 27, whereby the original condition of the valves 23, 23' is restored. The piston assembly carrying the tested rings 5 is thus automatically reciprocated in the sleeve 3, and the pressure exerted by the rings on the sleeve portion 7 may be indicated or recorded by the measuring circuit of the strain gage 8.

While only a single passage 1 and the associated elements, including a strain gage 8, have been shown in the drawing in order not to crowd the same, the cylinder 2 is normally provided with at least three, and preferably more passages 1 arranged in a circumferential row on a common axial level, and a pair of slots 6 is provided in the sleeve 3 at the inner orifice of each passage. The several strain gages 8 mounted on the corresponding bridge portions 7 thus provide simultaneous readings of piston ring pressure at several circumferentially offset parts of the ring. Similarly, several axially spaced circumferential rows of passages 1 may be provided to give simultaneous readings for the several rings 5 mounted on the testing piston assembly.

The precise configuration of the inner wall of the cylinder 2 has no significant effect on the precision and accuracy of the pressure readings that can be derived from the gage 8. The wall may practically be elliptical or otherwise rounded in a non-circular cross section. The effect of minor surface imperfections is compensated for by the soft copper coating on the sleeve 3. The soft coating yields under the pressure of the rings 5 to provide full area contact between the sleeve 3 and the cylinder 2. It will be appreciated that coating materials other than copper may be used for the same purpose if they are softer than the rigid material of the cylinder wall and the more flexible material of the sleeve 3. The use of plastic coatings is specifically contemplated, and many suitable plastics are available.

The response of the gage 8 to the pressure of the ring 5 is conditioned solely by the bridge portion 7 whose geometrical shape can be controlled precisely by very simple means. The bridge portion 7 can be deformed under pressure only in a circumferential direction since it may move freely in an axial direction. Its deformation under stress is thus readily calculated, and the performance of the illustrated apparatus is predictable from the known dimensions of the bridge portion 7 and from the known mechanical properties of its material of construction. Absolute values of ring pressure may therefore be determined with great precision.

When a permanent deformation of the bridge portion 7 tends unfavorably to affect the precision of the measurements made, the sleeve 3 may be removed and replaced in a simple manner by a similar or identical sleeve conforming with the inner wall of the cylinder 2.

While the apparatus of the invention thus provides more precise and more reliable pressure readings than the known devices of the type initially described, it can be built at lower cost and by workmen of relatively low skill.

What is claimed is:
1. An apparatus for testing piston rings comprising, in combination:
   (a) a cylinder having an axis and an axial wall formed with an inwardly open radial recess;
   (b) a sleeve conformingly received in said cylinder and having an inner axial face and an outer axial face about said axis,
      (1) a portion of said outer face being exposed in said recess,
      (2) said sleeve being less rigid than said wall;
   (c) a strain gage on said exposed face portion; and
   (d) holding means for holding a piston ring to be tested in engagement with the inner face of said sleeve adjacent said recess.

2. An apparatus as set forth in claim 1, further comprising a coating on said outer face of a material softer than the material of said sleeve and the material of said wall.

3. An apparatus as set forth in claim 1, said sleeve being formed with two spaced slots therethrough, said slots extending in said exposed face portion, and said strain gage being on a part of said face portion intermediate said slots.

4. An apparatus as set forth in claim 3, wherein said slots are circumferential relative to said axis and axially spaced from each other.

5. An apparatus as set forth in claim 1, wherein said holding means include a piston member formed with a circumferential groove adapted to receive said ring, and actuating means for moving said piston member axially in said sleeve.

6. An apparatus as set forth in claim 5, wherein said actuating means include an operating cylinder; an operating piston in said operating cylinder and dividing the same into two compartments; a source of fluid under pressure connected to said compartments; universal joint means connecting said piston member to said operating piston for joint movement; and control means responsive to axial movement of said piston member in said sleeve for controlling flow of said fluid to said compartments.

7. An apparatus as set forth in claim 6, wherein said piston member has a stem portion formed with a radial flange, a retaining plate axially movable on said stem portion toward and away from said flange, and a nut threadedly engaging said stem portion for axial movement thereon in axially abutting engagement with said retaining plate, whereby said ring may be held between said plate and said flange.

8. An apparatus as set forth in claim 1, wherein said recess constitutes an outwardly open radial passage through the wall of said cylinder.

References Cited

UNITED STATES PATENTS 1,994,388   3/1935   Erichsen.
2,448,735   9/1948   Pigott et al. _____ 73—120

JERRY W. MYRACLE, Primary Examiner